United States Patent [19]

McCain

[11] 3,882,885
[45] May 13, 1975

[54] METHOD OF HANDLING A LARGE DIAMETER SLURRY HOSE SYSTEM

[75] Inventor: David L. McCain, Ponca City, Okla.

[73] Assignee: Continental Oil Company, Ponca City, Okla.

[22] Filed: July 25, 1973

[21] Appl. No.: 382,423

[52] U.S. Cl............... 137/344; 301/5 P; 180/6.48; 180/79; 180/79.3; 104/243; 105/3
[51] Int. Cl.............................................. B62d 3/00
[58] Field of Search................. 180/74.3, 79, 6.48; 280/408, 419; 301/5 P; 104/242, 248, 243, 245, 118, 130; 105/182, 199 C, 34 R; 137/344

[56] References Cited
UNITED STATES PATENTS

| | | | |
|---|---|---|---|
| 2,056,219 | 10/1936 | Stout et al. | 105/34 R X |
| 2,769,664 | 11/1956 | Cornelius | 137/344 |
| 2,803,498 | 8/1957 | Touton | 137/344 |
| 2,896,858 | 7/1959 | Price | 137/344 X |
| 3,233,850 | 2/1966 | Merker et al. | 137/344 X |
| 3,352,493 | 11/1967 | Curtis | 137/344 X |
| 3,362,752 | 1/1968 | Densmore | 137/344 X |
| 3,557,707 | 1/1971 | Joy | 105/3 X |
| 3,583,639 | 6/1971 | Cornelius | 137/344 X |
| 3,593,667 | 7/1971 | Morris | 104/120 |
| 3,672,308 | 6/1972 | Segar | 104/130 X |
| 3,783,793 | 1/1974 | Perrott et al. | 104/245 X |
| 3,788,444 | 1/1974 | McWilliams | 180/6.48 X |
| 3,789,947 | 2/1974 | Blumrich | 301/5 P |

Primary Examiner—Henry T. Klinksiek
Attorney, Agent, or Firm—William J. Miller

[57] ABSTRACT

An apparatus for handling a flexible slurry hose system including apparatus for supporting the slurry hose system of the ground. The system has a cart, a clamp for attaching the hose system to the cart, and apparatus for moving the cart either along the axis of the hose system or at any angle transverse to the axis of the hose system so that, as the hose is taken from a storage section to an active section, the cart will move from a transverse axial position to an in-line axial position.

8 Claims, 6 Drawing Figures

PATENTED MAY 13 1975 3,882,885

METHOD OF HANDLING A LARGE DIAMETER SLURRY HOSE SYSTEM

BRIEF DISCUSSION OF THE INVENTION

This invention relates to a combination of apparatus for handling a flexible slurry pipe or hose which is connected between a terminal and a coal digging machine. The slurry handling system includes two hoses, one for transporting water or other fluid and the second for transporting the slurry which consists of the mined material and the fluid mixed together. Transportation of the hose will be provided by a plurality of carts which is spaced along the pair of hoses and not only supports the hoses off of the ground but also provides mobility to the hose along the axis of the pipe.

The carts are selectively controlled so that the pair of hoses will follow all movements of the coal digging machine into and out of the room where the coal is being dug. A certain portion of the total length of the pair of hoses is in storage, and the remainder is in active movement following the undulations of the coal digging machine. As the coal digging machine penetrates into the vein, that portion of the slurry hose system in storage will gradually be transferred to active use. The carts which support the hose slurry system in storage are designed so that they can move either transverse to the axis of the hose or along the axis of the hose. The hose system is taken out of storage by the cart supporting structure moving at an angle to the axis of the hose until the hose is in the active position when the cart system will have gradually moved from being transverse to the hose axis to an in-line position with the hose axis. The cart support system can either be powered or unpowered and can comprise either a rotatable wheel support system or a transverse wheel system, either of which will permit movement of the cart in a direction transverse to the axis of the hose.

DISCUSSION OF THE PRIOR ART

The best prior art is described in U.S. Pat. No. 3,260,548 entitled "Method and Apparatus for Continuously Mining and Transporting Coal" by E. H. Reichl and an application, Ser. No. 294,720, filed Oct. 3, 1972, entitled "A Mobile Slurry Handling System" by Eric H. Reichl.

In the patent a coal digging machine is connected to a terminal through a pair of flexible pipes. These flexible pipes are nonsupported but have a slightly greater length than they needed to go from the termination of the fixed pipes to the coal digging machine. Thus some storage is provided by the excessive length of the hose. The invention thus disclosed, however, does not take into consideration the excessive wear which will result from hoses which are made principally of steel reinforced rubber. These hoses may weigh as much as 100 pounds per foot when full, and movement of a hose of this weight over the rough surface of a mine passage floor will result in early failure of the hose.

In the application to Eric H. Reichl a plurality of carts is spaced along the hose system to support the hose off the ground and to provide mobility to the hose. The system further contemplates a means for storing a long length of hose and a means for activating the support carts to move only that portion of the hose which is not in storage. The carts will follow the movements of the coal digging machine into and out of the room where the coal is being removed. Further features will include means for removing the hose system for storage and for making turns in the mine passages.

Figure 1:
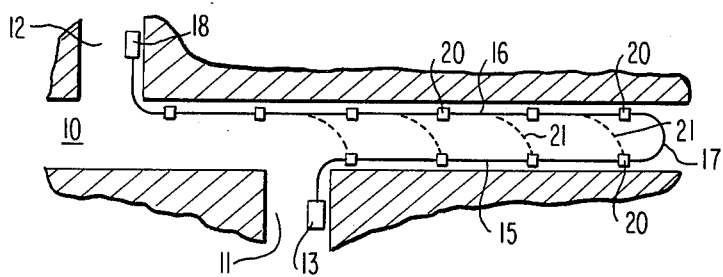
FIG. 1 illustrates a schematic drawing of the slurry hose handling system illustrating the direction of the movement of the carts having the slurry hose system mounted thereto.

Referring generally to all of the figures but in particular to FIG. 1, a portion of a mine is illustrated having a tunnel 10, a tunnel 11, and a room 12 which is presently being mined. A terminal 13 is mounted in tunnel 11 which connects with a pipe line system (not shown). Terminal 13 also contains the necessary slurry storage and pumping equipment for moving the slurry to the surface and fresh water back into the mine for connection with the slurry hose transportation system. A portion of the slurry hose system 15 is in storage. A portion 16 is in active use, and a portion 17 is being removed from storage and placed into active use or is being returned from active use to storage, depending upon the requirements of the mining machine 18 in room 12. In order to remove or return the slurry hose system to storage 15, a plurality of mobile carts 20 is attached to the hose system and traverse as an arc 21 as they move the slurry hose system from storage to active use, for example.

Figure 2:
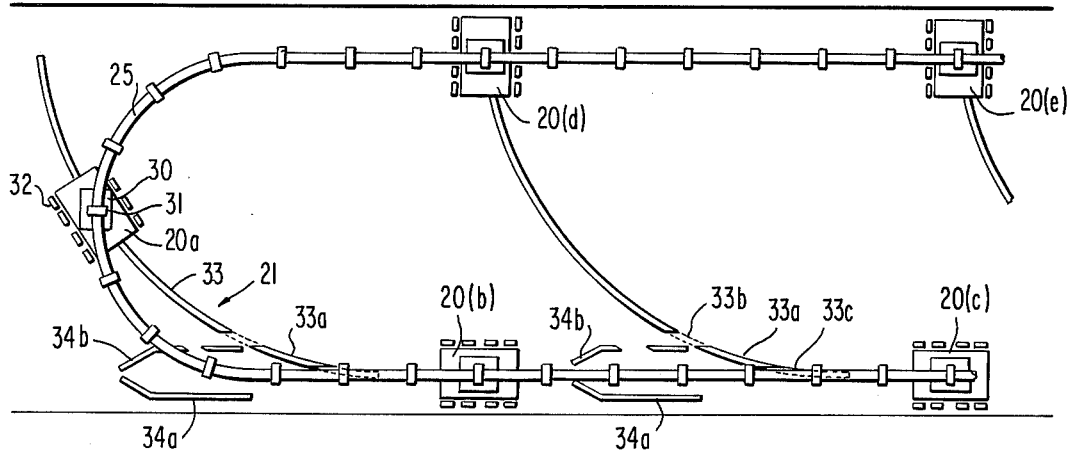
FIG. 2 is a top view of the slurry hose transportation system illustrating the use of tracks to control the movement of carts in and out of storage.

Referring to FIG. 2, a top view of the system better illustrates the carts and the method in which they move the slurry system from storage to active use or vice versa. A cart 20a is connected to a pair of hoses 25 (since one is mounted above the other, only one is visible) which is attached to the cart 20a through a turret 30 which includes a clamp 31. Cart 20a is supported by a plurality of wheels 32. A track 33 directs the movement of cart 20a along a prescribed arc 21 (see FIG. 1). Tracks 34a and 34b provide directional control for the cart as it approaches a track segment 33a, thus preventing an entanglement of track segment 33a with wheels 32 of carts 20b or 20c, which have previously passed by segments 33a.

Figure 3:
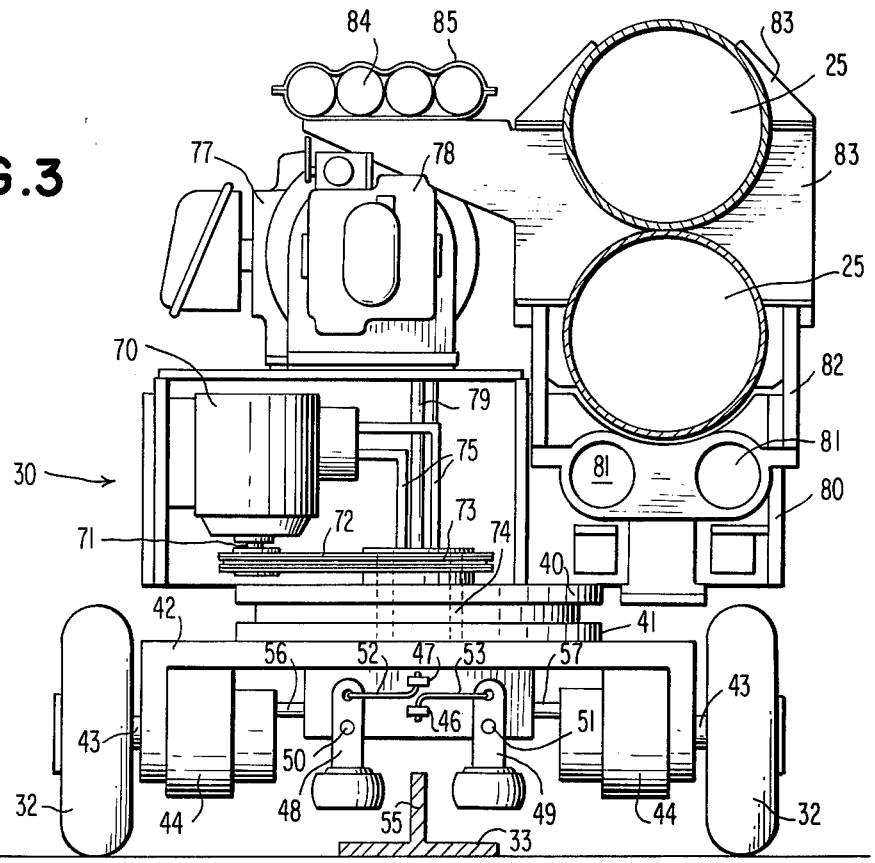
FIG. 3 is an end view of one of the carts shown in FIG. 2 illustrating the position of the track and the control system for the cart used to follow the track.

FIG. 3 is an end view of the cart 20 illustrated in FIGS. 1 and 2 and essentially consists of a turret 30 having a base 40 rotatably attached to base 41 which is secured to frame 42. Frame 42 has a plurality of wheels 32 attached through an axle 43 to a hydraulic motor 44. A control valve 45 has a pair of controls 46 and 47. Control arms 48 and 49 are pivotally attached to control valve 45 through pivots 50 and 51, respectively. A pair of mechanical arms 52 and 53 is connected respectively between control arms 48 and 49 and controls 46 and 47. Track 33 contains an upright 55 adapted to operate control 48 or 49.

Hydraulic pipes 56 and 57 interconnect control valve 45 with its respective hydraulic motors 44.

Electrical or hydraulic motor 70 has an output shaft 71 connected through a belt system 72 to a pulley 73. Pulley 73 is connected to hollow shaft 74 which is rigidly secured to base 41 and permits free rotation of base 40 axially thereabout. Necessary electrical connections and hydraulic connections 75 can pass through the opening in shaft 74 to control valve 45.

An electrical motor 77 is connected to a hydraulic pump 78 which furnishes power through pipes 79 to the control valve 45 for operating hydraulic motors 44. Attached to base 40 is a hose clamping system comprising a mounting frame 80, shafts 81 and a movable frame 82. Hoses 25 are secured to movable frame 82 by clamps 83. Necessary electrical power for all of the carts is supplied through a plurality of power cables 84 which are attached by clamp 85 to hose clamp 83.

Figure 4:
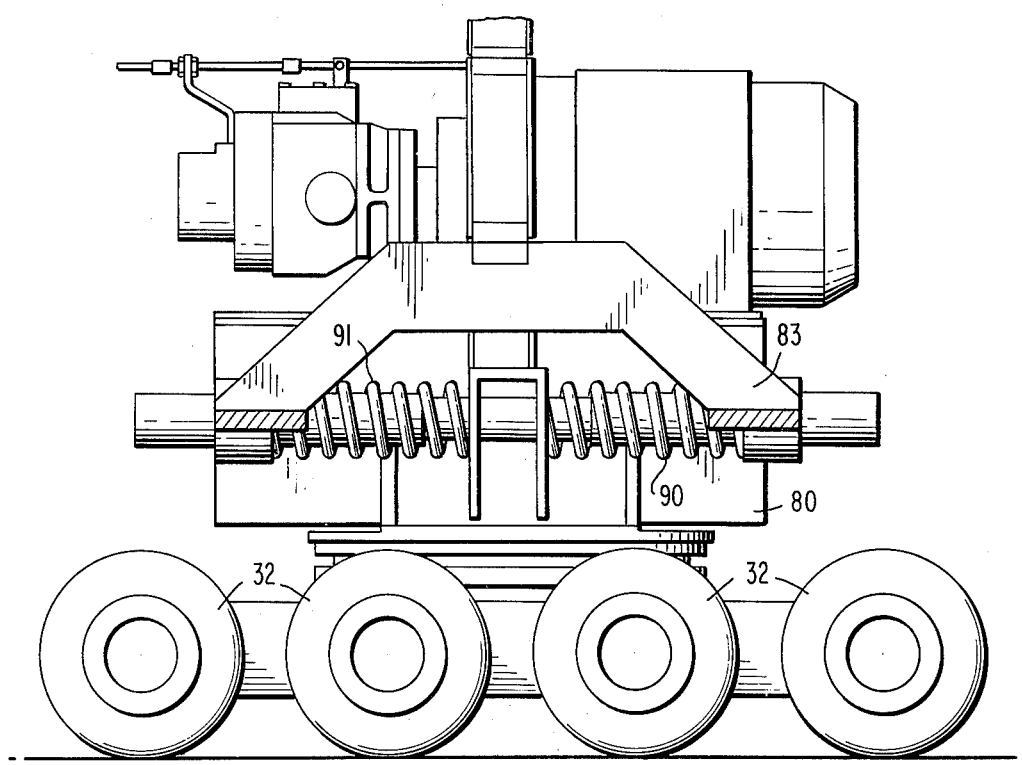
FIG. 4 is a side view of the cart illustrated in FIG. 3.

Referring to FIG. 4 springs 90 and 91 to provide a yieldable coupling between carts 20 and the rigid frame 80; thus, sudden movements of the cart will be transmitted by a yieldable pressure through springs 91 or 90.

Operation of the system illustrated in FIGS. 1 through 4 is as follows:

Assuming the carts 20d and 20e are in storage, 20b and 20c are active, and that 20a is moving from storage to active, control of cart 20a from storage to active is as follows:

First the cart is powered by either manually switching the cart on or by automatically signaling the cart from the coal mining machine through either tension on the hose or other suitable control methods. As cart 20a moves from storage to the active portion of the slurry line, it will traverse arc 21. In order to insure that 20a follows arc 21, it is preferable to use track 33 to guide the cart 20a along arc 21. As cart 20a deviates from its predetermined arc, arms 48 or 49 will strike upright 55 attached to track 33. Mechanical arms 52 or 53 will operate controls 47 or 46 causing hydraulic motors 44 to increase or decrease torque in accordance with the respective control arm struck by upright 55. The increase in torque will be continued until control arm 48 or 49 moves away from upright 55.

In FIG. 2 track portion 33a is shown permanently in place on the mine tunnel floor. If it is to remain in place, then tracks 34a and 34b should be used to direct approaching carts 20b or 20c, for example, around track portion 33a. Segments 33b and 33c should be removed in order to facilitate movement of the carts in either direction. It is obvious, of course, if segments 33a, 33b, or 33c are completely removed until it is necessary to remove the cart from storage, then track portions 34a and 34b would not be needed. As the carts are returned to storage, 33c should be replaced so that the approaching cart will have a guide onto the track 33.

It is obvious, of course, that the carts can be controlled manually by a miner so that they will move along a prescribed arc 21. The turret provides freedom of movement of the cart along the prescribed path or arc 21 and also permits the hose to follow its necessary arcuate movement from storage to active use. When carts 20 are returned to storage, the reverse procedure can easily be followed. Either the carts are controlled manually or by use of track 33.

Figures 5, 6:
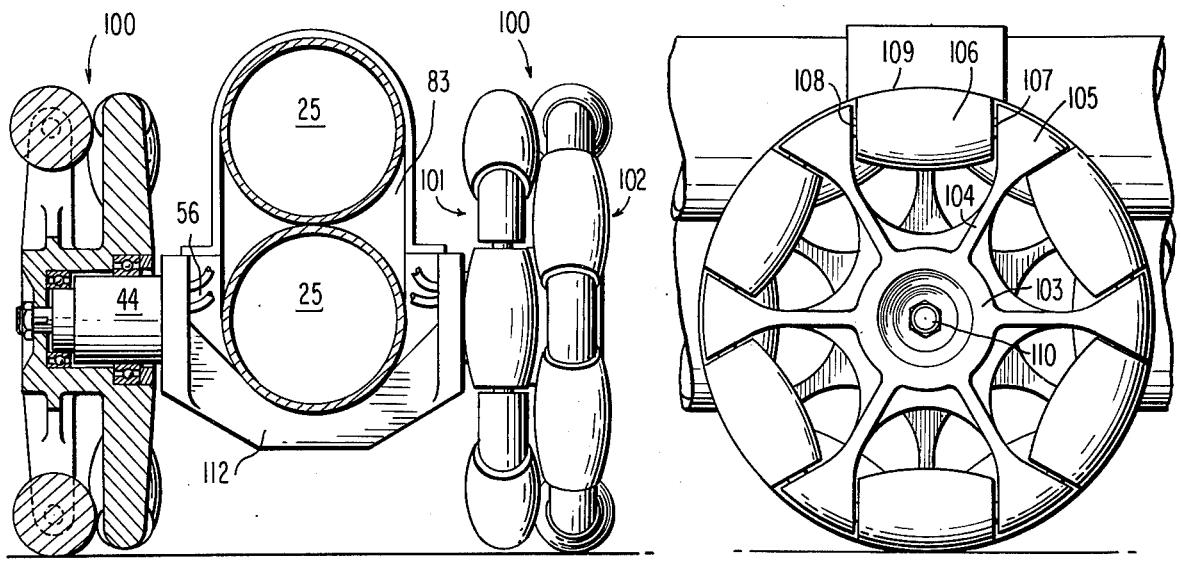
FIG. 5 is the end view of the hose support system incorporating a pair of transverse wheels.
FIG. 6 is a side view of the cart support system illustrated in FIG. 5.

Referring to FIGS. 5 and 6, an alternate embodiment of the cart is illustrated which uses a transverse wheel referred to generally by the number 100. Each transverse wheel comprises a pair of wheels 101 and 102, and each wheel 101 or 102 comprises a center hub 103 having a plurality of spokes 104. Attached at the peripheral end of spokes 104 are bearing hubs 105. Each bearing hub is adapted to journal a roller 106 through axles 107 and 108. The periphery 109 of roller 106 is arcuate in shape, and the radius of the arc is identical with the radius of the entire wheel 101 or 102. The mounting of wheels 101 or 102 on an axle 110 is such as to position roller 106 of wheel 102, for example, between rollers 106 of wheel 101. When the rollers are positioned as above described, a continuous rolling surface will be formed by the pair of wheels, regardless of the angular position of the wheels. Wheels 100 are journaled through axle 110 to hydraulic motor 44 which is itself rigidly secured to frame 112. Hose clamps 83 attach hoses 25 to frame 112. Hydraulic pipes 56 are connected to either a control valve, such as control valve 45 (not shown), or a hydraulic pump 78 (likewise not shown).

The operation of the transverse wheel cart illustrated in FIGS. 5 and 6 is similar to the operation described for the carts shown in FIGS. 1 through 4. The primary difference in the cart is that the cart in FIGS. 5 and 6 does not require a turret, since the transverse wheel will permit movement of the cart either along the axis of the hose 25 by rotation of wheels 100 about axle 110 or at any angle to the hose axis by a combination of movement consisting of either rotation of wheels 100 about axle 110 or rollers 106 about bearing hubs 105. If the movement of the cart is 90° of the axis of hose 25, all of the movement will take place by rotation of rollers 106 about hubs 105.

Conclusions

A slurry hose transportation system has been described which permits movement of the hose from storage to active use or vice versa by utilizing a cart which can move either the axis of the hose (as will be the case when the hose is in active use) or transverse to the hose (as will be the case when the cart is being removed from storage or placed in storage). One cart system is described with a turret to permit freedom of hose movement and a track to control the movement of the cart. A second cart uses transverse wheels which permit movement of the cart either along the axis of the hose or transverse to the axis of the hose without the necessity of a turret. Either system can be controlled manually or through the use of an aid such as a track, for example.

The turret in FIGS. 1 through 4 has been illustrated as being powered by motor 70. It is obvious, of course, that the turret could be operated without a drive system if the flexible pipes were stiff enough to supply sufficient torque to the turret to freely rotate same about shaft 74.

The transverse wheel cart system described in FIGS. 5 and 6 can be operated without self-contained power, by following the pipe as it is being moved by other means such as winches. An unpowered transverse wheel cart may also require external force to return it to storage.

It is obvious that other modifications and changes can be made in the apparatus disclosed in the specification without departing from the spirit and scope of the invention as described in the specification and appended claims.

We claim:

1. In an apparatus for hauling a slurry system having a flexible hose system which extends from a fixed end to a movable end and a portion of the system is led through a storage and active loop to control slack of said hose system during movement of the slurry system movable end, the apparatus including motive means for supporting said hose system from the floor of a mine, an improvement in said support system comprising:
   a. a plurality of carts, each having means for powered locomotion;
   b. clamping means for attaching each of said carts to said flexible hose system, said clamping means being rotatable in the horizontal plane relative to said carts; and
   c. means for selectively energizing said means for said powered locomotion to reversibly move selected ones of said carts between storage position and an angularly oriented active position to maintain uniform loop of said hose system.

2. An apparatus as described in claim 1 additionally including means for guiding each of said carts through a prescribed arcuate path over said mine floor.

3. An apparatus for hauling a slurry system having a flexible hose system which extends from a fixed end to a movable end and a portion of the system is led through a storage and active loop to control slack of said hose system during movement of the slurry system movable end, the apparatus including motive means for supporting said hose system from the mine floor, said system comprising:
   a. a plurality of carts, each having means for powered locomotion;
   b. means for attaching said hose system to each of said carts such that the hose system is horizontally rotatable relative to each cart;
   c. plural ground-contacting motive elements carried by each of said carts to enable selective movement of the carts when movement is imparted to said slurry system movable end; and
   d. Means energizable to move individual ones of said carts in a selected direction between the loop storage position which is transverse to the axis of said hose system and the loop active position which is angularly displaced therefrom.

4. An apparatus as described in claim 3 wherein each of said carts comprises:
   a. a base;
   b. transverse wheel means journaled to said base normal to the axis of said hose system; and
   c. means for rigidly securing said hose system to said base.

5. An apparatus for transporting a slurry system over the surface of the ground, said system extending from a fixed end through a stored portion, a slack loop, and an active portion to a movable end, comprising:
   a. a flexible products hose extending from the fixed end to the movable end;
   b. a plurality of cart support means;
   c. means for rotationally attaching each of said plurality of cart support means in spaced relation along the length of said hose;
   d. motive means mounted on each of said carts and supporting in contact with the ground for movement over the surface of the ground; and
   e. means for activating selected cart motive means for providing selective mobility of each of said plurality of cart support means for movement between stored and active positions on opposite sides of said slack loop.

6. An apparatus as described in claim 5 including a plurality of track means, one for each of said plurality of cart support means, which are attached to the surface of the ground, and means carried by each of the plurality of cart support means for individually following said respective track means, whereby each of said carts will follow a proper path to move said hose from said stored portion to and along said active portion.

7. An apparatus as described in claim 5 wherein said means for providing mobility along or transverse to the axis of said hose comprises means for rotatably journaling said hose attaching means to said cart support means.

8. An apparatus as described in claim 7 wherein said means for providing mobility along or transverse to the axis of said hose comprises a transverse wheel.

* * * * *